United States Patent
Oliver et al.

(10) Patent No.: US 9,773,133 B2
(45) Date of Patent: Sep. 26, 2017

(54) RFID TAG AND READER CHARACTERISTIC DETERMINATION USING GROUP KEYS

(71) Applicant: Impinj, Inc., Seattle, WA (US)

(72) Inventors: Ron Oliver, Seattle, WA (US); Matt Robshaw, Seattle, WA (US); Tan Mau Wu, Seattle, WA (US)

(73) Assignee: IMPINJ, INC., Seattle, WA (US)

( * ) Notice: Subject to any disclaimer, the term of this patent is extended or adjusted under 35 U.S.C. 154(b) by 43 days.

(21) Appl. No.: 14/815,823

(22) Filed: Jul. 31, 2015

(65) Prior Publication Data

US 2016/0034728 A1 Feb. 4, 2016

Related U.S. Application Data

(60) Provisional application No. 62/032,388, filed on Aug. 1, 2014.

(51) Int. Cl.
*G06K 7/10* (2006.01)
*H04L 9/08* (2006.01)
*H04L 9/32* (2006.01)

(52) U.S. Cl.
CPC ........ *G06K 7/10257* (2013.01); *H04L 9/0833* (2013.01); *H04L 9/3271* (2013.01); *H04L 2209/805* (2013.01)

(58) Field of Classification Search
CPC .......... G06K 7/10257; H04L 2209/805; H04L 9/0833; H04L 9/3271
See application file for complete search history.

(56) References Cited

U.S. PATENT DOCUMENTS

| 2005/0206552 A1* | 9/2005 | Friedrich ........... G06K 7/10297 342/42 |
| 2008/0165005 A1* | 7/2008 | Burbridge ............... G06F 21/31 340/572.1 |
| 2008/0170695 A1* | 7/2008 | Adler .................... H04L 9/0841 380/277 |

\* cited by examiner

*Primary Examiner* — Joseph Feild
*Assistant Examiner* — Yong Hang Jiang
(74) *Attorney, Agent, or Firm* — Turk IP Law, LLC

(57) ABSTRACT

An RFID tag possesses a group key issued by an authorized entity. When a reader requests some information from the tag, such as an identifier, the tag transmits a random number to the reader. The tag then determines one or more reader characteristics based on a response received from the reader. In one embodiment, the tag generates a verification value based on the random number and the group key and compares the verification value to the received response. If the comparison succeeds, the tag may treat the reader as possessing particular functionality, authorized to implement a particular feature, and/or authorized to receive information from the tag. If the comparison fails, the tag may treat the reader as lacking particular functionality, not authorized to implement a particular feature, and/or not authorized to receive information from the tag. The tag may request additional response(s) from the reader before determining the reader characteristic(s).

17 Claims, 12 Drawing Sheets

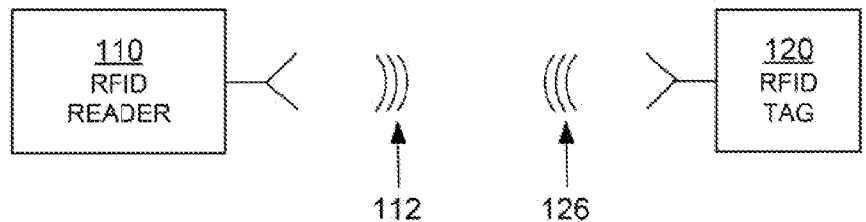
FIG. 1
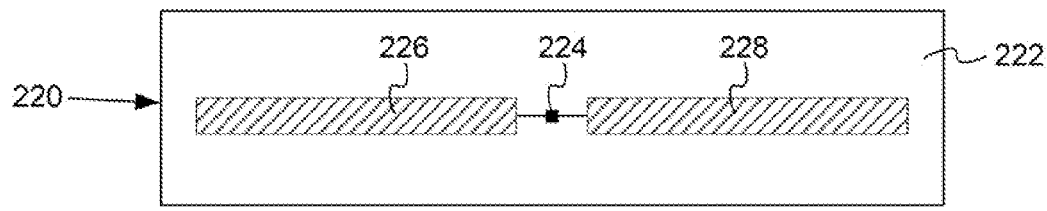
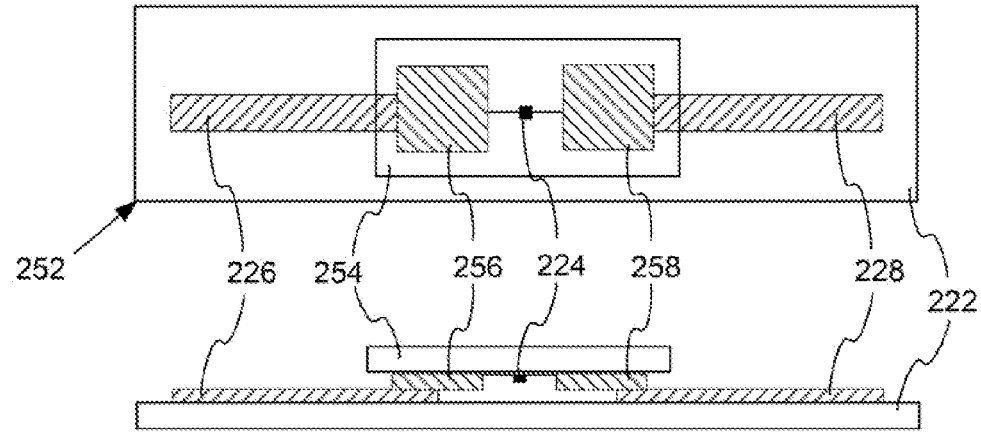
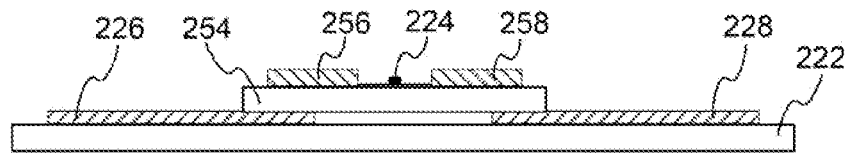
FIG. 2

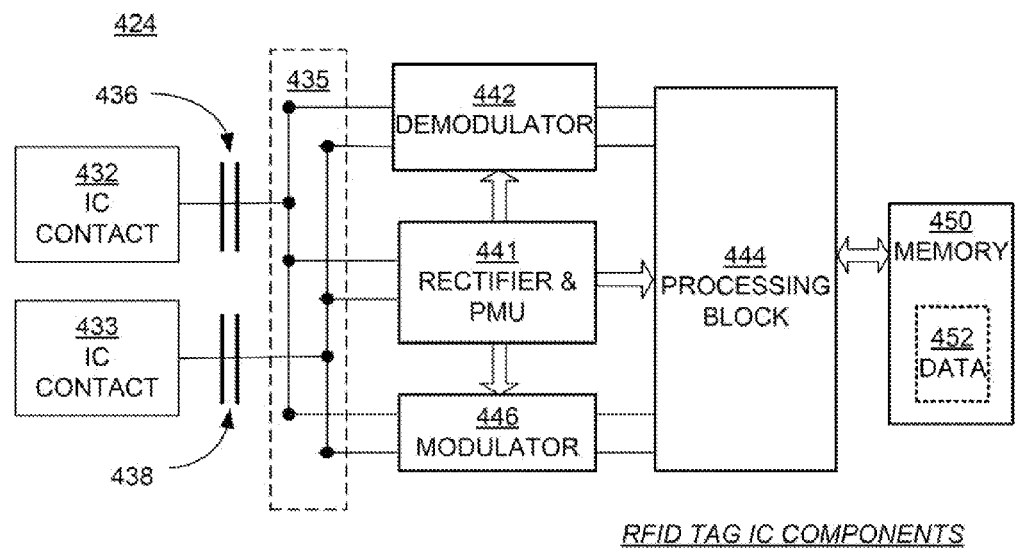
FIG. 4
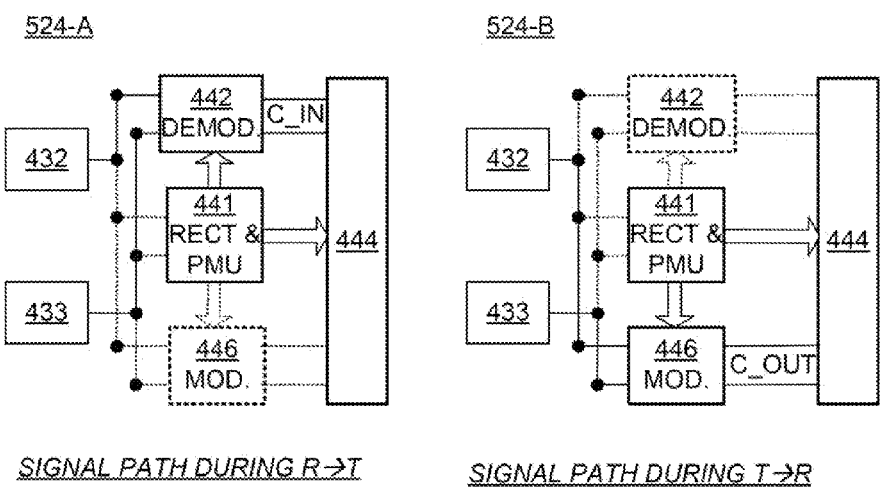
FIG. 5A  FIG. 5B

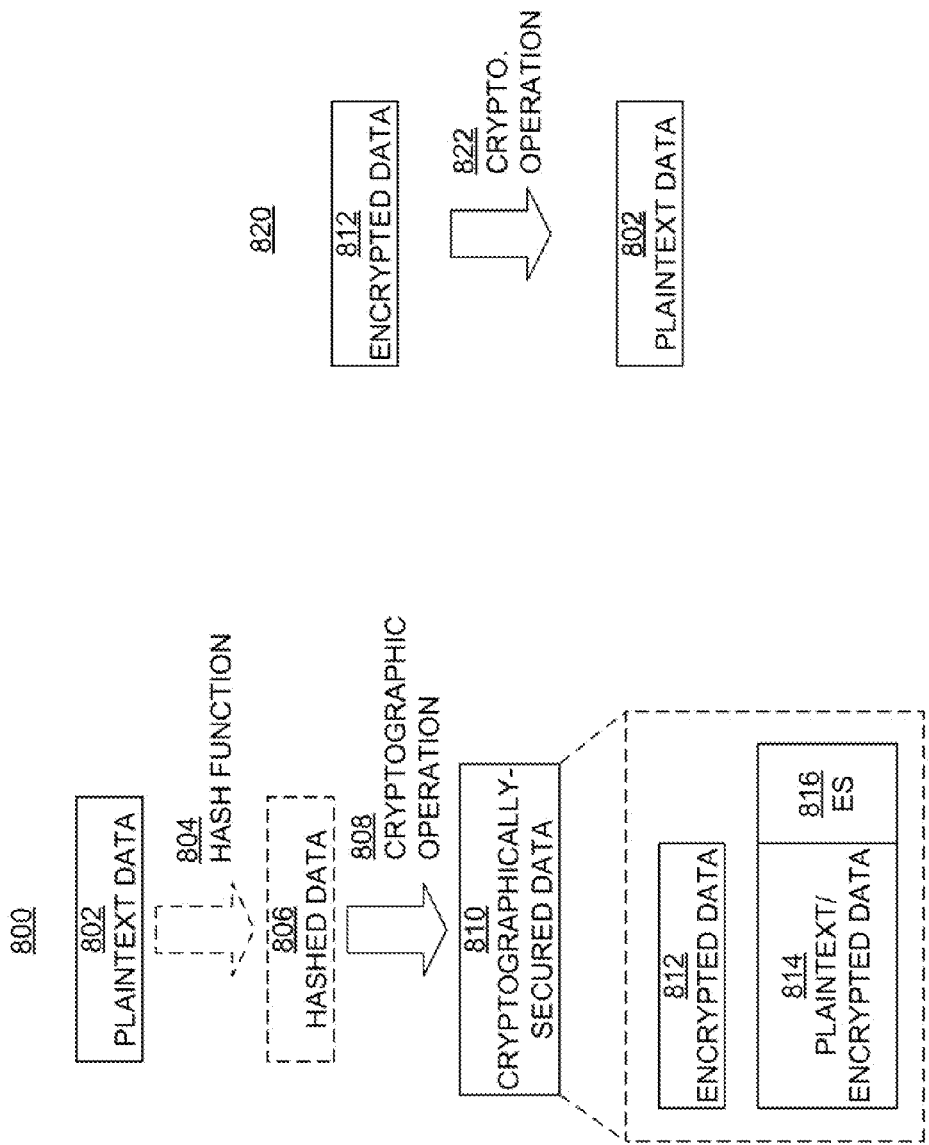

RFID TAG AND READER CHARACTERISTIC DETERMINATION USING GROUP KEYS

CROSS-REFERENCE TO RELATED APPLICATION

This Application claims benefit under 35 U.S.C. §119 (e) of U.S. Provisional Application Ser. No. 62/032,388 filed on Aug. 1, 2014. The Provisional Application is herein incorporated by reference in its entirety.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RFID wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RFID wave may encode data stored in the tag, such as a number. The response is demodulated and decoded by the reader, which thereby identities, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RFID signal they receive. Such RFID tags do not include an energy storage device and are called passive tags. Of course, even passive tags typically include temporary energy- and data/flag-storage elements such as capacitors or inductors.

As mentioned above, RFID systems allow tagged objects to be identified, located, and tracked. However, in some situations it may be useful to limit the identification and tracking of tagged items, for example to address privacy concerns. In other situations, it may be useful to limit the use of certain RFID tag, reader, or system functionalities to particular situations or environments.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to an RFID tag determining reader characteristics. The tag possesses a group key issued by an authorized entity. When a reader requests some information from the tag, such as an identifier, the tag transmits as random number to the reader. Upon receiving as response from the reader, the tag determines one or more reader characteristics based on the received response. In one embodiment, the tag generates a verification value based on the random number and the group key and compares the verification value to the received response. If the comparison succeeds, the tag may treat the reader as possessing particular functionality, authorized to implement a particular feature, and/or authorized to receive information from the tag. If the comparison fails, the tag may treat the reader as lacking particular functionality, not authorized to implement a particular feature, and/or not authorized to receive information from the tag. In some embodiments, the tag may request additional response(s) from the reader before determining the reader characteristic(s).

Embodiments are also directed to an RFID reader determining tag characteristics. The reader possesses a group key issued by an authorized entity. When the reader requests information from a tag, the tag transmits a tag random number to the reader. The reader then transmits a reader response based on the tag random number, the group key, and optionally a reader random number. The tag may then transmit a tag response to the reader. Upon receiving the tag response, the reader determines one or more tag characteristics based on the received tag response. In one embodiment, the reader generates a verification value based on the tag random number and the group key and compares the verification value to the received tag response. In another embodiment, the reader compares the optional reader random number to the received tag, response. In either case, if the comparison succeeds, the reader may treat the tag as possessing particular functionality and/or authorized to implement a particular feature. If the comparison fails, the reader may treat the tag as lacking particular functionality and/or not authorized to implement a particular feature.

These and other features and advantages will be apparent from as reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIG. 8A is a flow diagram illustrating the generation of cryptographically-secured data.

FIG. 8B is a flow diagram illustrating data recovery from encrypted data.

DETAILED DESCRIPTION

Figure 3:
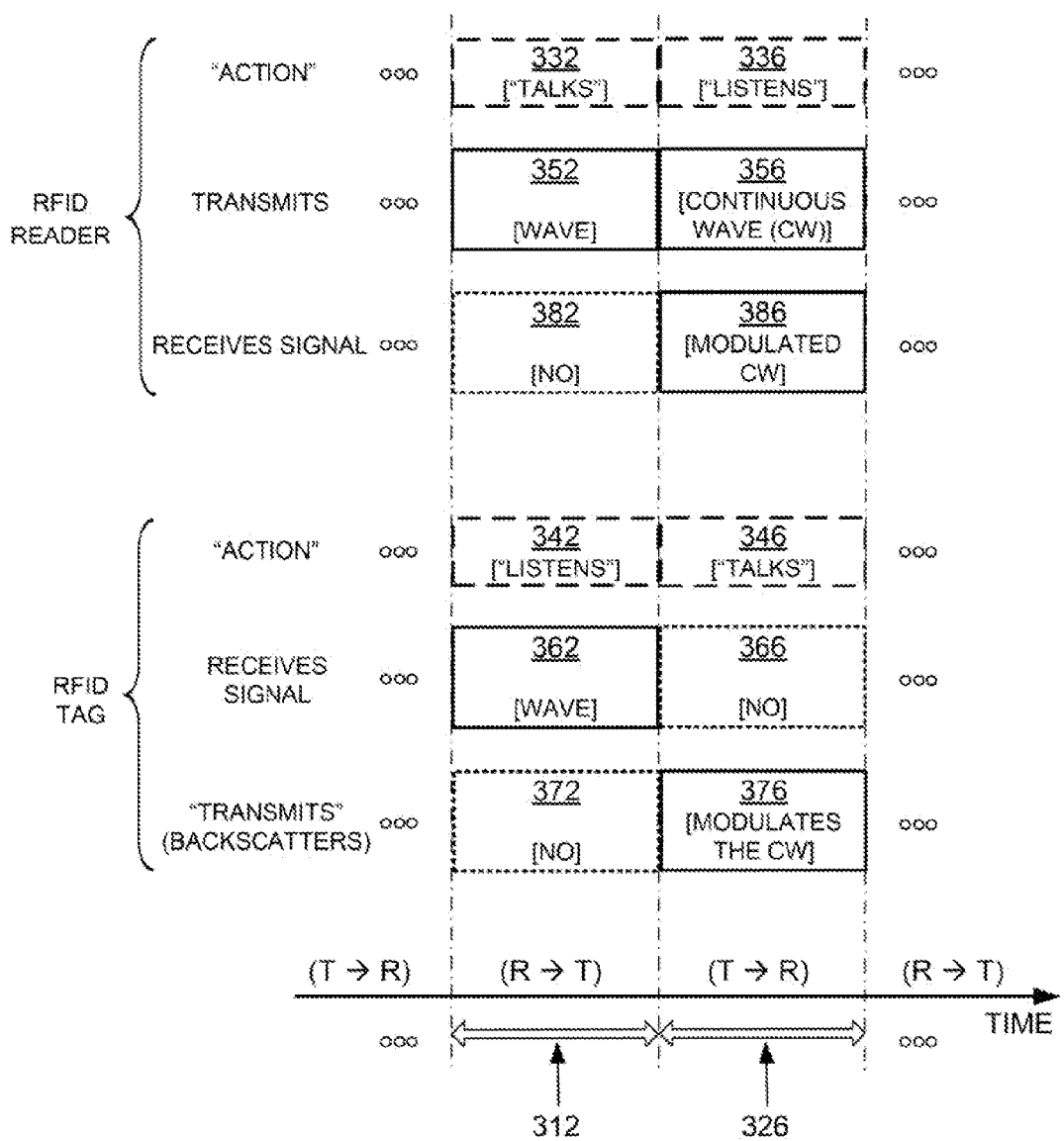
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar information-storage technologies as will be known to those skilled in the art. Some portions of memory may be writeable and some not. "Command" refers to a reader request for one or more tags to perform one or more actions, and includes one or more to instructions preceded by a command identifier or command code that identifies the command and/or the tag instructions. "Instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals)

Reader 110 and tag 120 communicate via, signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable. IC contacts (not shown in FIG. 2). The term "electrically coupled" as used herein may mean to direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which both harvests power and responds if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of as shunt-connected circuit element which is coupled to the IC contacts. Varying the impedance of a series-connected circuit element is another means of modulating the antenna's reflectance.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

The components of the RFID system of FIG. 1 may communicate with each other in any number of modes. One such mode is called full duplex. Another such mode is called half-duplex, and is described below.

FIG. 3 is a conceptual diagram 300 for explaining half-duplex communications between the components of the RFID system of FIG. 1, in this case with tag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and as following sample T→R communication session occurs during a time interval 326. Of course interval 312 is typically of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According, to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that typically encodes no information. This CW signal serves both to transfer energy to tag 120 for its own internal power needs, and also as a carrier that tag 120 can modulate with its backscatter. Indeed, during interval 326, according to block 366, tag 120 does not receive as signal for processing. Instead, according to block 376, tag 120 modulates the CW emitted according to block 356 so as to generate backscatter signal 126. Concurrently, according to block 386, reader 110 receives backscatter signal 126 and processes it.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID) tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RFID signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interlacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

FIG. 5A shows version 524-A of components of circuit 424 of FIG. 4, further modified to emphasize a signal operation during a R→T session during time interval 312 of FIG. 3. Demodulator 442 demodulates an RFID signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
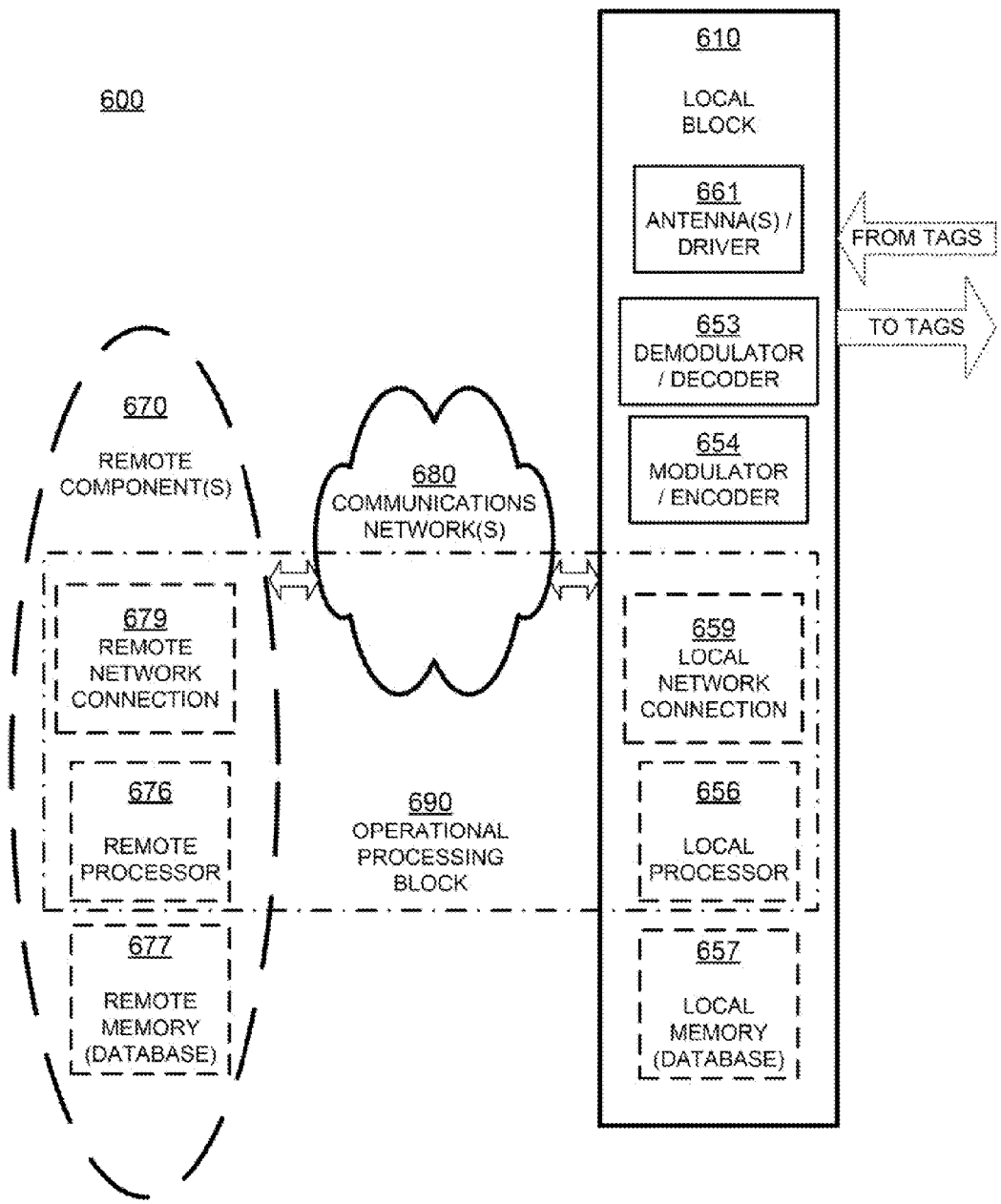
FIG. 6 is a block diagram showing a detail of an RFID reader system, such as the one shown in FIG. 1.

FIG. 6 is a block diagram of an RFID reader system 600 according to embodiments. RFID reader system 600 includes a local block 610, and optionally remote components 670. Local block 610 and remote components 670 can be implemented in any number of ways. It will be recognized that RFID reader 110 of FIG. 1 is the same as local block 610, if remote components 670 are not provided.

Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with the tags. Local block 610 includes a block 651 of an antenna and a driver of the antenna for communicating with the tags. Some readers, like that shown in local block 610, contain a single antenna and driver. Spine readers contain multiple antennas and drivers and a method to switch signals among them, including sometimes using different antennas for transmitting and for receiving. Some readers contain multiple antennas and drivers that can operate simultaneously. A demodulator/decoder block 653 demodulates and decodes backscattered waves received from the tags via antenna/driver block 651. Modulator/encoder block 654 encodes and modulates an RFID wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, secret keys, key pairs, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be as Local Area Network (LAN), a Metropolitan Area Network (MAN), to Wide Area Network (WAN), a network of networks such as the internet, or a local communication link, such as a USB, PCI, and so on. Local block 610 may include a local network connection 659 for communicating with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They can access each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an authentication function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

Of the above-described elements, it may be advantageous to consider a combination of these components, designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RE wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. It may be advantageous to consider such a system as subdivided into components or modules. Some of these components or modules can be implemented as hardware, some as software, some as firmware, and some as a combination. An example of such a subdivision is now described, together with the RFID tag as an additional module.

Figure 7:
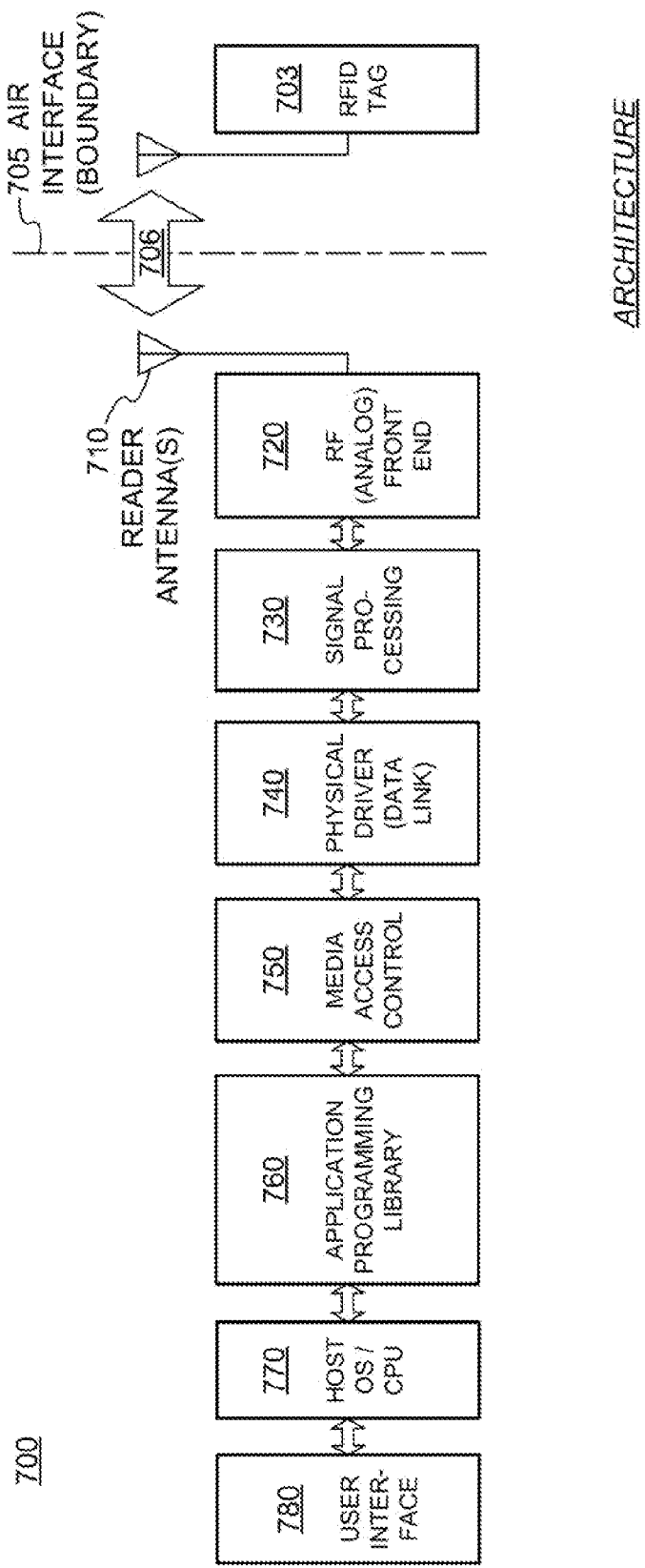
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 also includes a physical-driver module 740, which is also known as data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include as host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create as tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them.

As mentioned previously, embodiments are directed to employing RFID readers for tag authentication using public-key cryptography. Embodiments additionally include programs, and methods of operation of the programs. A program is generally defined as a group of steps or operations leading to a desired result, due to the nature of the elements in the steps and their sequence. A program is usually advantageously implemented as to sequence of steps or operations for a processor, but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions, data, keys, signatures, and other data of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program ma be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

FIG. 8A is a flow diagram 800 illustrating the generation of cryptographically-secured data. Flow diagram 800 begins with plaintext data 802, which is the data to be cryptographically secured. In some embodiments, a hash function 804 may first be used to generate an optional hashed data value 806. A cryptographic operation 808 may then be used to generate cryptographically-secured data 810 from plaintext data 802 and/or hashed data 806. The cryptographic operation 808 may implement any combination of suitable cryptographic techniques or algorithms, such as symmetric key algorithms (e.g., DES or AES), asymmetric key algorithms (e.g., RSA), stream ciphers, block ciphers, or any other suitable algorithm. When symmetric key algorithms are used, cryptographically-secured data 810 may be generated using a secret key known to the sender of plaintext data 802 and the intended recipient of cryptographically-secured data 810. When asymmetric key algorithms are used, cryptographically-secured data 810 may be generated using a private key known to the sender of plaintext data 802 but not the intended recipient of cryptographically-secured data 810.

Cryptographically-secured data 810 may be cryptographically secured in any number of ways. In some embodiments, cryptographically-secured data 810 includes encrypted data 812, formed by encrypting plaintext data 802 using cryptographic operation 808. In other embodiments, cryptographically-secured data 810 includes data 814 and an electronic signature (ES) 816 associated with data 814 and used to allow a recipient to authenticate data 814. Data 814 may be plaintext (e.g., plaintext data 802) or encrypted (e.g., encrypted data 812). If encrypted, data 814 may be processed to recover plaintext data 802 as described below.

FIG. 8B is a flow diagram 820 illustrating data recovery from encrypted data. Flow diagram 820 may be performed by a recipient of cryptographically-secured data 810, where cryptographically-secured data 810 includes encrypted data 812. The recipient may use a cryptographic operation 822 to recover plaintext data 802. Cryptographic operation 822 may be the reverse of cryptographic operation 808, and like cryptographic operation 808 may implement any combination of suitable cryptographic techniques or algorithms. If cryptographic operation 822 uses symmetric key algorithms, the recipient may use as known secret key to decrypt the encrypted data 812, whereas if cryptographic operation 822 uses asymmetric key algorithms, the recipient may use a known public key corresponding to the sender's private key to decrypt the encrypted data 812.

As described above, cryptographically-secured data 810 may include an electronic signature (ES) 816 that allows a recipient to authenticate data 814. Electronic signatures are cryptographic structures used to verify that a particular, signed message originated from as particular source and has not been altered. The sender of a signed message generates an electronic signature based on a sender key and the original message and "signs" the message by attaching the signature. A message recipient can then cryptographically process the attached signature to determine whether it corresponds to the received message. If so the message may be presumed authentic, and if not the message may be presumed counterfeit. Electronic signature 816, if verified by a recipient of data 814 provides assurance that data 814 originated from a particular source and was not altered en route to the recipient.

Electronic signatures may be generated using symmetric and asymmetric cryptographic techniques. An electronic signature generated using symmetric cryptography may be known as to "message authentication code" (MAC). To generate a MAC for a message, a signatory (also referred to as a sender) uses a secret key and the message to generate the MAC. The sender may then send the message and the associated MAC to a recipient. The recipient in turn can use the same secret key to verify that the MAC corresponds to the message and that the sender knows the secret key. In some embodiments, the sender may instead only send the MAC to the recipient, and the recipient may recover the associated message from the MAC using the secret key.

An electronic signature generated using asymmetric cryptography may be known as a "digital signature" (DS). To generate a DS for a message, a signatory or sender uses the message and the private key from a private/public key pair to generate the DS. The private key and public key in the key pair are mathematically related to each other, and the signatory keeps the private key secret while making the public key available to others. The sender may then send both the message and the associated DS (referred to as a "digital signature with appendix") to a recipient. The recipient can then in turn use the public key to verify that the DS corresponds to the message and that the sender possesses the private key.

The term "electronic signature" or "ES" as used in this disclosure may refer to a MAC generated using symmetric cryptography or to a DS generated using asymmetric cryptography. A verified MAC or DS gives the recipient reason to believe that the message was created by a known sender, and that it was not altered in transit.

In some embodiments, digital signatures may be generated without using a separate hash, using a digital signature scheme with message recovery. In such embodiments, a DS may be generated directly from the data, and only the DS sent to the recipient. During verification, the recipient directly decrypts the DS with the public key to recover the data. Of course, other digital or electronic signature schemes may be used.

An important attribute of digital signatures is that they are difficult to forge or clone. A number of standards have been developed for digital signatures. The Digital Signature Standard (DSS) is a U.S. Government standard for digital signatures. DSS is specified in Federal Information Processing Standards (FIPS) 186-1 and FIPS 186-3. FIPS 186-1 specifies two digital signature algorithms, the Digital Signature Algorithm (DSA) and the RSA digital signature algorithm. FIPS 186-3 includes a third digital signature algorithm, the Elliptic Curve Digital Signature Algorithm (ECDSA). FIPS 180-3, Secure Hash Standard (SHS), specifies the hash functions to be used in conjunction with FIPS 186-1 and FIPS 186-3.

Figure 8C:
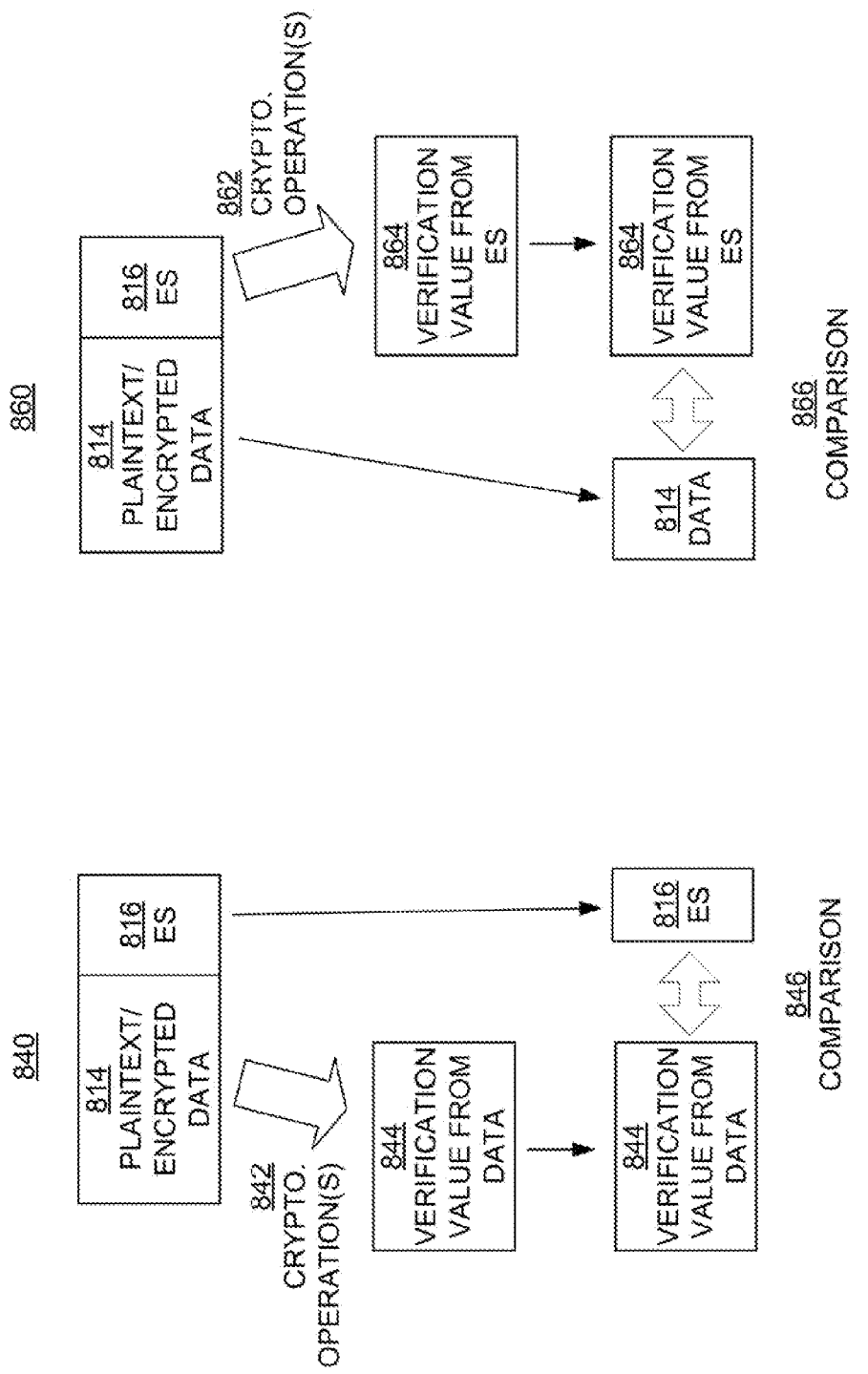
FIG. 8C shows processes for the verification of an electronic signature.

FIG. 8C shows processes 840 and 860 for the verification of an electronic signature 816. In process 840, suitable for electronic signatures generated using symmetric cryptographic techniques, a recipient of data 814 (which may be plaintext, encrypted, or hashed data) and associated ES 816 wishes to verify the authenticity of ES 816 and/or data 814. The recipient, which knows the secret key used to generate ES 816, uses the secret key and one or more cryptographic operations 842 to generate a verification value 844 from data 814. In some embodiments, verification value 844 may be a new electronic signature computed based on data 814 and the secret key known to the recipient. The recipient may then compare (846) verification value 844 and ES 816. If the two correspond, then the recipient may deem data 814 and/or ES 816 authentic. If the two do not correspond, then the recipient may deem data 814 and/or ES 816 counterfeit.

In process 860, a verification value 864 is generated from ES 816 instead of data 814. Process 860 may be suitable for electronic signatures generated using symmetric or asymmetric cryptographic techniques. A recipient of data 814 and associated ES 816 knows either the secret key used to generate ES 816 or a public key corresponding to the private key used to generate ES 816. The recipient then uses the known secret/public key and one or more cryptographic operations 862 to generate verification value 864 from ES 816. Verification value 864, if generated properly, may include at least some portion of the authentic data 814. The recipient then compares (866) verification value 864 to data 814. If the two correspond, then the recipient may deem data 814 and/or ES 816 authentic. If the two do not correspond, then the recipient may deem data 814 and/or ES 816 counterfeit.

Figure 9:
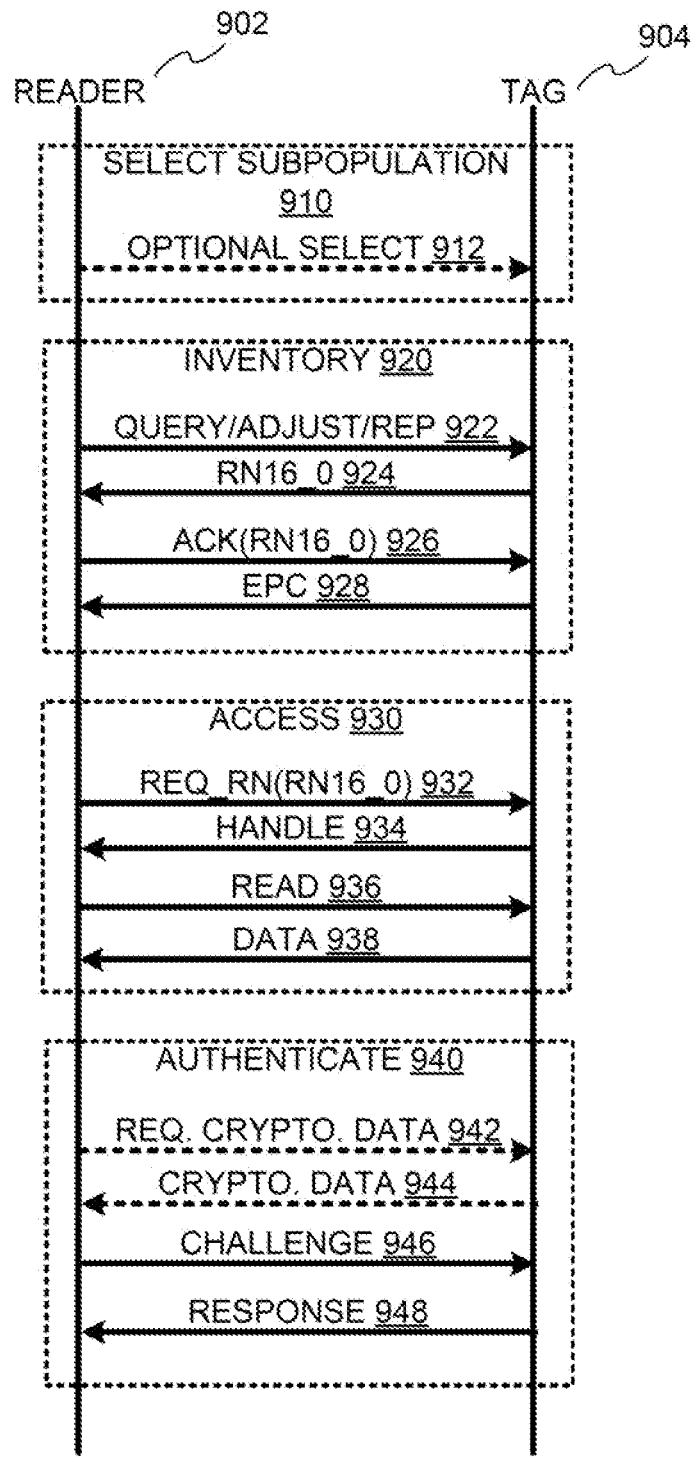
FIG. 9 illustrates exchanges between a reader and a tag according to embodiments.

FIG. 9 illustrates command-response exchanges 900 between a reader 902 and a tag 904 according to embodiments. The sequence of signals proceeds downward chronologically (i.e., lower signals occur later), with signals from the reader 902 to the tag 904 indicated by arrows pointing right and signals from the tag 904 to the reader 902 indicated by arrows pointing left. Although the commands and responses in diagram 900 of FIG. 9 assume that the reader 902 and tag 904 are using the Gen2 Specification for their communications protocol, the present invention does not require using the Gen2 Specification, and other communications protocols and command sequences are possible. Additionally, even when using the Gen2 Specification the particular order of operations need not follow that shown in FIG. 9. Other orderings are possible; exchanges can be merged, enhanced, or eliminated; and the authentication can be spread across various operations between reader and tag.

The interactions between reader 902 and tag 904 in diagram 900 begin with an optional tag subpopulation selection 910, where the reader 902 selects one or more tags from a tag population for inventorying and/or authentication. For example, the reader 902 may broadcast a selection command 912 that includes one or more criteria to the tag population. The criteria in selection command 912 may include one or more tag flag values, at least a portion of a tag identifier, and/or at least a portion of other data that can be stored on tags. Tags in the population that meet the one or more criteria, for example having tag flag values and/or stored data that match the tag flag value(s) and/or data specified in selection command 912 may be considered as "selected". In some embodiments, selection command 912 may be the Select command of the Gen2 Specification.

Reader 902 then performs an inventory 920 to singulate an individual tag from the tag population (or from within a subpopulation of selected tags, if the reader perform optional tag selection 910). In some embodiments, the reader performs the inventory 920 according to the Query-ACK sequence described in the Gen2 Specification. In the Gen2 Query-ACK sequence, reader 902 first transmits a Query/QueryAdj/QueryRep command 922. A tag that meets the criteria for responding (e.g., tag 904) may then reply with a random/pseudorandom number (referred to herein as an "RN") spec page $RN16\_0$ 924 having a length of 16 bits. Upon receipt of $RN16\_0$ 924, the reader transmits an Acknowledge command (ACK) 926 with the $RN16\_0$ to the tag, which may then respond with its EPC 928.

After performing the inventory 920, reader 902 may then perform access 930 in order to access and read tag information from tag 904. For example, tag 904 may store (and the reader may access) an identifier ID, which may be the tag's EPC or another tag identifier. Tag 904 may also store a tag key TKEY, which may be a secret key for use in symmetric cryptographic operations or a private key for use in asymmetric cryptographic operations, a corresponding tag public key TPK in the latter case, an electronic signature ES associated with the ID, EPC, and/or TPK, and optionally one or more other parameters, such as a tag random number. Reader 902 may begin the access 930 by transmitting a REQ_RN command 932 with the $RN16\_0$ received from tag 904, which requests a new RN from tag 904 for use as a tag handle. Tag 904 may then respond with a handle 934, which may be a 16-bit RN different from $RN16\_0$. Handle 934 may then be used to identify subsequent interactions between reader 902 and tag 904. For example, reader 902 may include handle 934 in a command meant for tag 904, and tag 904 may include handle 934 in a reply to a reader to identify the originating tag. Reader 902 may then transmit read command 936 to read data stored at tag 904. For example, read command 936 may specify one of more of the optional ID, TPK, ES, and any other desired parameters, by memory location and/or data identifier or name. Upon receiving read 936, tag 904 may respond to reader 902 with the requested data.

Reader 902 may then challenge tag 904 to prove its identity in authentication step 940. In authentication step 940, reader 902 may transmit challenge 946 to tag 904. A challenge is a message that contains a random number (which may be encrypted) and one or more cryptographic parameters. The challenge instructs a receiving entity, such as a tag or reader, to determine a cryptographic response based on the random number, the cryptographic parameter(s), and entity information such as an entity key, an entity identifier, or any other suitable entity information. The receiving entity may itself compute the cryptographic response using a symmetric or asymmetric cryptographic algorithm, or may have another entity compute and provide the cryptographic response to the receiving entity. The challenge may be determined based on the random number and/or an entity random number. A challenge may originate from another tag, a reader, or some other entity. In the situation described in diagram 900, challenge 946 originates from reader 902 and may include a reader random number.

In some embodiments, tag 904 may first provide cryptographic data 944 to reader 902 to enhance the security of authentication step 940. Reader 902 may transmit a cryptographic data request 942 to tag 904, or tag 904 may send cryptographic data 944 of its own accord, either in a plaintext or encrypted format. Reader 902 may then include cryptographic data 944 in challenge 946. Cryptographic data 944 may be random (e.g., a tag random number), or may be a precomputed cryptographic value based on, for example, TKEY of tag 904. In the former case, tag 904 may generate cryptographic data 944 as needed, for example using a random or pseudorandom number generator and/or using TKEY of tag 904. In the latter case, cryptographic data 944 may be known as a "coupon" or "commitment", and may either be an actual cryptographic value, an indicator that corresponds to but is not the actual cryptographic value, or be derived using the cryptographic value as a coupon precursor. Because a tag coupon represents a pre-computed value, it can be used to facilitate an asymmetric cryptographic transaction between tag 904 and another entity (e.g., reader 902) by reducing the computation performed by tag 902. For security reasons, a particular tag coupon may typically be discarded after a single cryptographic transaction. Therefore, a coupon-enabled tag that is configured for multiple transactions may store for have access to) a number of tag coupons, each of which is unique for at least the tag.

In some embodiments, tag 904 may use to counter value in a tag coupon counter to keep track of its tag coupons. Tag 904 may use the counter value to determine which tag coupons have been used, or may also generate tag coupons based on the counter value using, for example, a pseudorandom number generator seeded based on a tag coupon counter value. In some embodiments, tag 904 may provide the counter value to the other party, which in turn may be able to generate the tag coupon using the counter value.

Upon receiving challenge 946, tag 904 may compute response 948 based on the reader random number in challenge 946, the TKEY, other cryptographic parameters included in the challenge, cryptographic data 944 if used, handle 934, another tag RN such as RN16_0 924, and/or any other suitable parameter. In some embodiments, tag 904 may use an RN different from cryptographic data 944 to generate response 948. For example, the RN used to generate response 948 may be derived from cryptographic data 944 based on some algorithm or may be entirely independent of cryptographic data 944. Tag 904 may then send the computed response 948 to reader 902. At this point reader 902 may be able to verify response 948 using the reader random number, cryptographic data 944, the TPK, and/or any other previously-received or known parameter. For example, reader 902 may itself verify the response, or may send the challenge, the received response 948, and other information to a verification authority for verification. As described above, some authentication variants may use a tag RN while others may not; some variants may include a command count or a message-authentication code; other variants may include the reader encrypting the random number in the reader-tag challenge; and yet others may include fewer or more steps than shown.

In embodiments where some tag-stored data (e.g., the tag identifier, a TPK if used, and/or cryptographic data 944) is signed with an electronic signature ES, a reader may verify the ES using a signing authority master public key associated with the ES. The reader may identify the signing authority or the particular master key associated with the ES based on the tag ID. If the ES signs a TPK, the reader may first verify the ES and therefore the TPK, then use the TPK to verify a subsequent tag response. For example, the reader may transmit a reader random number RN_RDR encrypted with the TPK to the tag. Upon receiving a tag response, the reader may verify the tag response by determining whether it includes a random number that corresponds to RN_RDR. In other embodiments the reader may send RN_RDR to the tag, receive an encrypted random number from the tag, decrypt the received random number using the TPK, and verify the tag or tag response by comparing the sent RN_RDR with the decrypted, received random number.

In other authentication embodiments the reader may send a tag response to a challenge to a network-connected verification authority for verification, without needing to use the tag TPK. The verification authority has some knowledge of the interrogated tag(s) (e.g., the tag key TKEY for one or more tags and/or the encryption algorithm(s) used by one or more tags). The verification authority may be known to the reader a priori, or the reader may query a network for the identity of an appropriate verification authority. In some embodiments, a tag may store the identity of a verification authority suitable for verification, and the reader may read the verification authority information from the tag. For example, referring to FIG. 9, reader 902 may send response 948, cryptographic data 944, challenge 946, and/or a tag identifier (e.g., EPC 928) to the verification authority. The verification authority may then determine the tag key TKEY and/or the particular encryption algorithm used by tag 904 (e.g., by looking it up based on the received tag ID) and use the determined TKEY/encryption algorithm, along with tag challenge 946 and/or cryptographic data 944, to decrypt or verily response 948. If the verification authority is able to decrypt/verify response 948 based on its knowledge of tag 904 (e.g., TKEY/encryption algorithm), then the verification authority confirms response 948 and thereby corroborates the tag's (or attached item's) authenticity.

In some embodiments, the verification authority may generate challenge 946 and send it to reader 902 for transmission to tag 904. In this case, reader 902 may not transmit challenge 946 back to the verification authority, because the verification authority already knows challenge 946. Optionally, the verification authority may generate and provide a random number (e.g., the reader random number or an entirely different random number) for reader 902 to use to generate challenge 946.

As described above, embodiments include different orderings of interactions between reader and tag. For example, in some embodiments reader 902 sends challenge 946 during selection 910, preceding, access 930, and tag 904 may compute and store response 948 in memory for subsequent reading. The tag computation may also include a tag RN (e.g., handle 934 and/or RN16_0 924) and/or additional data (e.g., cryptographic data 944), and the tag may store the tag RN and/or additional data for subsequent access by the reader. One reason a reader may choose to send challenge 946 with select 902 is for multiple tags to hear challenge 946 and compute their respective cryptographic responses in parallel. Because cryptographic computations can be time intensive, enabling multiple tags to compute responses in parallel allows more rapid authentication of a population of tags. In some embodiments, challenge 946 may be sent to multiple tags simultaneously, separately from select 902. In some embodiments, a challenge that is transmitted to an individual tag may be an Authenticate command of the Gen2 Specification, and a challenge that is broadcast to multiple tags may be a Challenge command of the Gen2 Specification.

As mentioned above, the commands and signals in sequence 900 do not have to be performed in the particular order shown, or even grouped as shown. The commands and signals may be separated, combined, or interspersed among each other. For example, tag 904 may transmit a tag identifier with response 948 to challenge 946, instead of in inventory 920 or access 930. Tag 902 may transmit its identifier with response 948 as consecutive messages, or may concatenate response 948 with the tag identifier, for example by prepending response 948 with the tag identifier, appending the tag identifier to response 948, or otherwise combining the tag identifier and response 948 in the same message. As another example, reader 902 may send cryptographic data request 942 during tag selection 910. Because select 912 is broadcast to a population of tags, multiple tags may receive the cryptographic data request 942. In response, each tag that receives the cryptographic data request 942 may generate or otherwise prepare its own cryptographic data. Reader 902 may then subsequently read each tag (e.g., using read 936) to retrieve its cryptographic data.

In some embodiments, authentication 940 may include to command count (e.g., a count from the reader indicating the number of commands it has transmitted or a count from the tag indicating the number of commands it has received) and/or an electronic signature. Electronic signatures may include digital signatures generated via asymmetric cryptographic techniques and/or message authentication codes generated via symmetric cryptographic techniques. Other authentication steps may include more or fewer steps than the particular authentication 940 shown in sequence 900.

In some embodiments, reader-tag interactions may be enhanced by encoding additional data onto otherwise Gen2-compliant commands. For example, as depicted in FIG. 9, reader 902 and tag 904 may exchange RNs, such as RN16_0 924 or handle 934, as part of inventory 920 or access 930. In addition, as described above the same handle 934 may then be included in subsequent reader commands and tag responses to identify a target to (for a reader command) or an originating tag (for a tag response). In some embodiments, a reader and/or tag may encode additional data using the RN16_0 924 or handle 934. In this case, the RN16_0 924 and handle 934 may not strictly be "random" or "pseudo-random" numbers, and may vary within a particular operation. For example, in inventory 920, tag 904 transmits RN16_0 924 to reader 902 in response to Query/QueryAdj/QueryRep command 922. Reader 902 may then transmit an acknowledgement command 926 that does not include RN16_0 924, and instead includes a different number that encodes some additional data. Similarly, in access 930, each of the messages (REQ_RN 932, handle 934, read 936, and data 938) may include an RN, either RN16_0 924 or handle 934. By varying the RN used beyond RN16_0 924 and handle 934 to encode additional data, reader-tag interactions may be streamlined or sped up.

In one embodiment, the additional data encoded onto the RN may be used to identify a specific characteristic associated with a tag or a reader. For example, a tag or reader capable of correctly decoding and responding to the additional data encoded onto the RN may have features, characteristics, or permissions that other tags or readers do not.

In some embodiments, a tag may be configured to only provide particular identifiers to authorized readers. In general, tags typically respond to any reader request for tag identification by replying with a tag identifier, an item identifier (e.g., an EPC such as EPC 928), or a portion of the tag or item identifier. However, in some situations it may be useful to limit such identification and tracking capability to certain readers. For example, travelers at an airport or in as transit terminal carrying RFID tags or tagged items (e.g., luggage or tickets associated with RFID tags) may be comfortable allowing certain RFID readers, such as readers associated with the airport/transit terminal, to identify and track their tags, but may not want all RFID readers, such as those associated with passers-by or casual eavesdroppers, to be able to do so.

As one example, a tagged ticket for a metro system might be configured to be read at a distance by metro-installed RFID readers used to monitor traffic flow and detect overcrowding, but not by other, illegitimate RFID readers (i.e. those not installed by the metro authorities). Similar situations might arise for conference facilities, theme parks, sporting, musical or other cultural events; places where large numbers of attendees might be expected and where the ability to aggregate information on the movement of attendees can be beneficial both to manage resources and manage health and safety concerns.

While the above example pertains to tags restricting tag identifier access to authorized readers, in some embodiments a reader may restrict reader identifier access to authorized tags, in a similar fashion.

In other embodiments, a tag or reader may be configured to operate in particular states or enable certain features only when interacting with certain readers or tags. Such states may include a secured state in which the tag or reader accepts and responds to cryptographic messages, a private state in which the tag or reader allows access to certain identifiers, or any other suitable state. Features that are only enabled when interacting with certain readers or tags may include access to particular portions of tag or reader memory, different link, encodings to increase read range, reduce bandwidth, and/or increase data throughput, alternative methods for powering the tag, alternative tag or reader cryptographic key management schemes, alternative tag or reader cryptographic algorithms or schemes, error detection and correction, the use of tag or reader-connected sensors, tag readability adjustment fir tag population management, and/or access to and adjustment of the functionality of a device interfaced to the tag or reader.

In these situations, a tag or reader that is legitimate, able to support a functionality/feature, and/or authorized to support the functionality/feature may possess a group key or some shared information. The legitimate reader/tag may then determine whether its counterpart (i.e., another reader or tag) also knows the group key or shared information.

In some embodiments, a legitimate tag sends a data value (e.g., an RN or a fixed value) to a reader and uses the data value and the group key in a cryptographic process to generate a first verification value. The tag then determines whether the reader responds with a verification value that corresponds to the first verification value. If the two values do not correspond, then the tag may treat the reader as lacking particular functionality, not authorized to implement a particular feature, and/or not authorized to receive information from the tag. If the two values do correspond, the tag may treat the reader as possessing particular functionality, authorized to implement a particular feature, and/or authorized to receive information from the tag. In some embodiments, the tag may instead attempt to further verify the reader's authenticity by determining whether the reader can provide another correct verification value.

Figure 10:
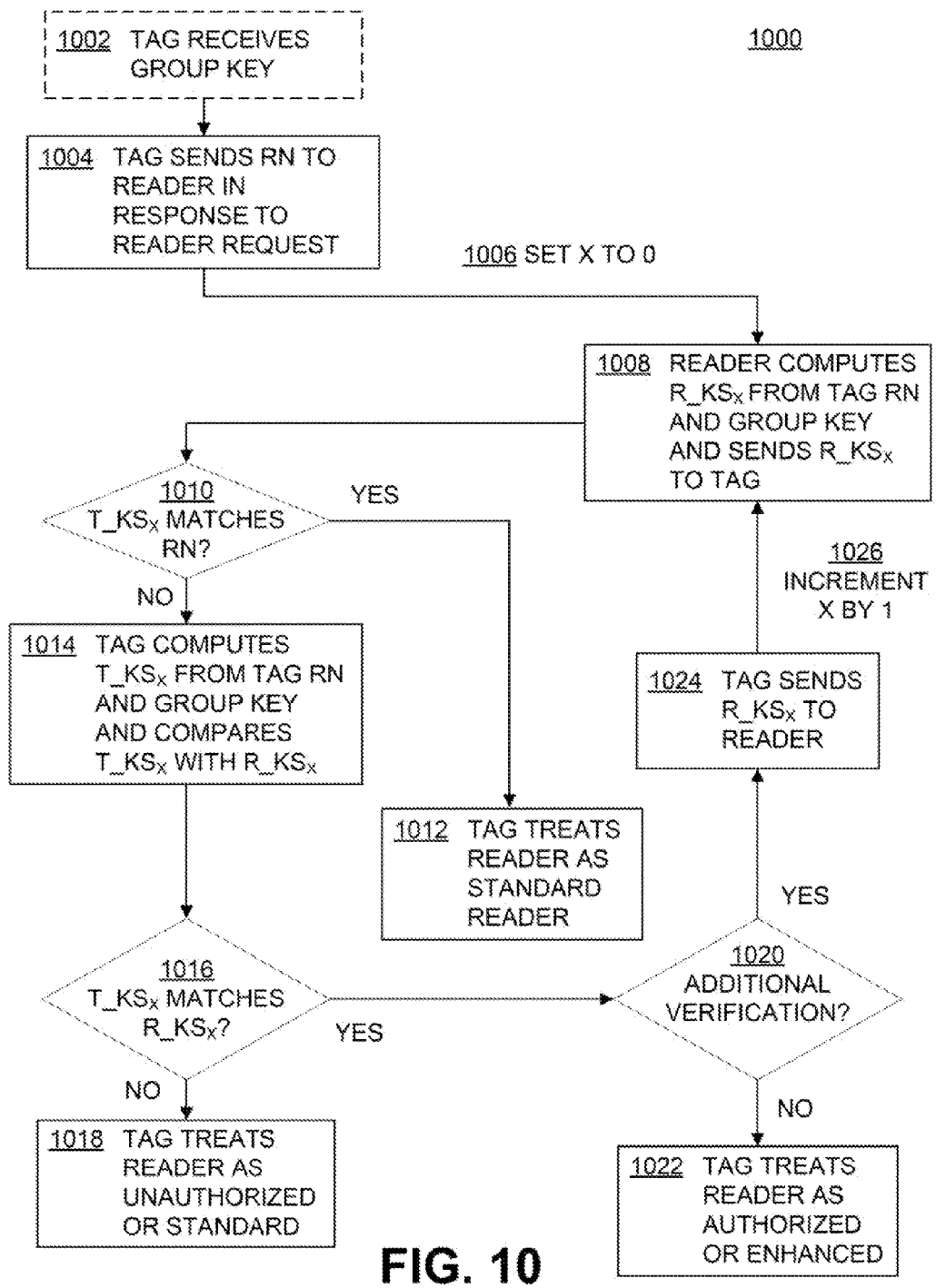
FIG. 10 is a flow diagram illustrating an RFID tag determining reader characteristics according to embodiments.

FIG. 10 is a flow diagram 1000 illustrating an RFID tag determining reader characteristics according to embodiments. At step 1002, an RFID tag receives a group key issued by some entity. The tag may be owned or embedded in an item owned by a person (e.g., an identification card), or may be embedded in an item that is later provided to a person (e.g., an airline or transit ticket that is issued to a traveler). The group key may be a secret key (as used in symmetric cryptography) or a set of secret keys, and may be written to the tag by a reader associated with the entity. In some embodiments, the group key may be a public key or set of private keys, with authorized readers knowing the corresponding private key(s). Similarly, in other embodiments the group key may be a private key or set of private keys, with authorized readers knowing the corresponding public key(s).

In some embodiments, the group key may be a pre-determined string or generated to have a specific form or value, for instance it may be generated to be sparse, redundant, or contain an identifier. In some embodiments, the issued group key is temporary and only valid for a predetermined or dramically-determined time duration, either relative or absolute. For example, an issued group key may be valid for the next hour or the next 24 hours. An issued group key may instead be valid until the end of the current hour, until the end of the current day, or until the end of a particular event (e.g., the end of a concert or the departure time of a train or airplane flight). An issued group key may be valid for one tag, a restricted population of tags, or a large population of tags. In some embodiments, different entities may individually or collectively determine multiple group keys, and some of or all of the multiple group keys may be used in place of a single group key.

In some embodiments, the entity may be tied to a particular location. For example, the entity could be an owner, controller, or monitor of a facility, such as a retail or wholesale store, a building, laboratory, yard, warehouse, distribution center, construction facility, plant, military installation, transit station (e.g., a train, bus, or subway station or an airport), ship, parking lot, shipping container, event grounds such as a fairground), or similar. In other embodiments, the entity may also or instead be associated with a larger geographic location or may not be associated with a specific geographic location. For example, the entity could be a government, a police force, a company or corporation, or any other suitable entity.

At some point after the tag receives the group key, a reader may communicate with the tag. For example, a person possessing the tag having the group key may enter a facility as described above, and a reader associated with the facility or some other entity may request information from the tag such as a tag or item identifier or request that the tag engage in some interaction. Before complying with the reader request, the tag first attempts to verify that the requesting reader is in fact authorized to make the request or is able/authorized to engage in the requested interaction by determining whether the reader possesses the group key. To do so, at step 1004 the tag sends a data value, such as a random number RN or a fixed value, to the requesting reader. In some embodiments, the data value may be selected to meet certain requirements. For example, the RN may be selected to meet random number or payload length restrictions in a protocol, such as the Gen2 Specification. In these embodiments, the RN may be one of the random numbers transmitted during, exchanges 900 in FIG. 9 (e.g., RN16_0 924 or handle 934). In some embodiments, the tag may repeat the verification process, described further below. In these embodiments, the tag (and the requesting reader) may set a verification value increment value X used to track the number of verifications to 0 at optional step 1006.

At step 1008, if the requesting, reader knows the group key, the requesting reader computes a verification value R_KS$_0$ (R_KS$_x$ where X=0) from the tag-provided RN and the group key and sends R_KS$_0$ to the tag, for example as a data value included in a reader acknowledgement command. The acknowledgement command may be an ACK command as described in the Gen2 Protocol, or may be any other reader command sent in response to a tag message. In some embodiments, the requesting reader computes R_KS$_0$ using a stream cipher having RN and the group key as inputs. For example, suppose that the group key, denoted "Y", has a length of 80 bits and the RN has a length of 16 bits. The requesting reader may set up as stream cipher SC(Y, RN||RN), where RN||RN (RN joined to RN) serves as the stream cipher initialization value, and use the stream cipher to generate a keystream, or series of key bits. In some embodiments, the requesting reader may set up a stream cipher SC(Y, f(RN)), a block cipher BC(Y, f(RN)), or a MAC function MC(Y,f(RN) and treat the output as a keystream. The function f( ) may be any suitable algorithm. For example, the function f( ) may include one or more arithmetic operations, logical operations, bitwise operations, bit-shifting operations, truncation operations (i.e., operations that reduce the bit length of an input code, for example by discarding input code bits), extension operations (i.e., operations that increase the bit length of an input code, for example by padding or concatenation), and/or any other suitable operations. The requesting reader may then select some of the generated key bits (e.g., the first 16 key bits generated, denoted $s_0, s_1, \ldots, s_{15}$) to use as the verification value R_KS$_0$ sent to the tag. While Y and the initialization value above have lengths of 80 bits and 32 bits, respectively, in other embodiments Y and/or the initialization value may be longer or shorter. In seine embodiments, the keystream may be generated using a hash function. In other embodiments, the keystream may be derived or related directly to the group key without the action of any cryptographic algorithm.

At step 1010, the tag receives the verification value R_KS$_0$ and determines whether the received verification value matches the RN provided in step 1004. If so, the tag may proceed to step 1012 and transition to an operating state in which the tag concludes that the requesting reader is a standard reader and lacks certain features. The tag in turn may not use those features to communicate with the reader. In some embodiments, the tag may also (or instead) conclude that the requesting reader is not authorized to receive further tag information, and may cease to communicate with the requesting reader.

On the other hand, if at step 1010 the tag determines that the received verification value does not match the RN provided in step 1004, at step 1014 the tag itself computes a verification value T_KS$_0$(T_KS$_x$ where X=0) from the RN and the group key, in the same way the reader computes R_KS$_0$. For example, the tag may set up the same cipher (e.g., stream cipher SC(Y, RN||RN) or block cipher BC(Y, f(RN)) and use the generated key bits as the verification value T_KS$_0$. At step 1016, the tag may compare the R_KS$_0$ received from the requesting reader with the tag-generated T_KS$_0$. If the two verification values do not match, then at step 1018 the tag may determine that the requesting reader either does not actually know the group key and therefore is not authorized to receive information from the tag or not authorized/able to engage in a requested interaction, or that an error has occurred during the communication. In any case, if the two verification values do not match the tag may transition to another operating state in which it does not change its functionality or activate any alternative features. For example, the tag may reply with an alternative identifier in response to a request from the reader for a particular identifier (e.g., the EPC). The alternative identifier may be a truncated version of the actual identifier, a random number, a precomputed alternative identifier value (e.g., a sequence of zeroes or ones), or any other suitable data that is not the identifier. In some embodiments, the tag may not respond to a reader request for the identifier, may respond with an error code, or may even refrain from subsequent interactions with the reader.

On the other hand, if at step 1016 the tag determines that the two verification values do match, then at step 1020 the tag may determine whether additional reader verification should be done. For example, the tag may seek additional assurance that the requesting reader has authorization, because it is possible (although unlikely) that a reader that does not know the group key could determine the correct verification value $R\_KS_0$. In some embodiments, the tag may determine whether additional reader verification is necessary based on a reader authentication threshold. For example, the tag may consider the reader authenticated if the tag has received a number of correct verification values from the reader equal to or greater than the reader authentication threshold. As another example, the tag may consider the reader authentication if the tag has engaged in a number of interactions with the reader involving the group key equal to or greater than the reader authentication threshold.

If the tag determines that additional reader verification should be done, at step 1024 the tag may send $R\_KS_0$ back to the reader to indicate that additional verification is requested. In some embodiments, the tag may instead send some other data back to the reader, such as a predetermined string or value, instead of $R\_KS_0$. Subsequently, at step 1026 the reader (and the tag) may increment X by 1 upon determination that additional verification is requested. The reader and tag may then perform steps 1008-1020 again, with the new increment value. In some embodiments, the reader may compute $R\_KS_1$ from the original tag RN and the group key, where $R\_KS_1$ includes the next set of generated key bits from the cipher-generated keystream. For example, $R\_KS_1$ may include the next set of 16 key bits generated in the keystream, denoted $s_{16}, s_{17}, \ldots, s_{31}$. The tag, upon receiving $R\_KS_1$, itself computes a corresponding $T\_KS_1$ and compares the two verification values. If the comparison is successful, then the tag has additional assurance that the reader is authorized and possesses the group key. This process may be repeated until the tag is satisfied either that the reader is authorized or the reader is not authorized.

In other embodiments, instead of sending $R\_KS_x$ to the reader after the additional verification decision in step 1020, the tag might compute $T\_KS_1$ and return this to the reader. The reader can itself compute the corresponding $R\_KS_1$ and verify whether $R\_KS_1=T\_KS_1$. If the verification holds, the reader might deduce that the to possesses the same group key and that the tag is an authorized tag. The reader would then generate $R\_KS_2$ as the response to be sent to the tag on the subsequent loop through step 1008.

In other embodiments, instead of using subsequent sets of key bits generated from the same stream cipher for additional verification, the tag may provide a different random number to use in the verification. For example, the tag may provide a second random number RN2, and the reader and tag may use key bits generated from another stream cipher SC(Y, RN∥RN2) for verification.

If the tag determines that the reader is authorized, then at step 1022 the tag may transition to an operating state in which it provides the requested information to, or engages in the requested interaction with, the requesting reader, or otherwise adapts its functionality in the presence of an authorized or enhanced reader. The tag may provide any requested information in a cryptographically secure format to prevent an eavesdropper from reading the requested information during transmission. In some embodiments, the tag may encrypt the requested information using the next (or some subsequent) set of generated key bits (e.g., $R\_KS_2$ or $s_{32}, s_{17}, \ldots, s_{47}$, or $R\_KS_N$ or $s_{16N}, s_{16N+1}, \ldots, s_{16N+15}$). The tag may transmit an indication of the exact set of generated key bits used to encrypt the requested information, and the reader may use the indication and its known group key to generate the key bits used to decrypt the requested information. Similarly, the reader may encrypt a message to the tag using a subsequent set of generated key bits, and the tag may be able to generate the key bits based on the group key and a key bit indication (if provided).

In diagram 1000, the tag compares the received $R\_KS_x$ with the tag-generated $T\_KS_x$ at step 1016, and if the two verification values do not match the tag assumes that the reader is unauthorized or standard. In some embodiments, if the two verification values do not match the tag may compute one or more other $T\_KS_x$ values and compare the received $R\_KS_x$ with the other $T\_KS_x$ values. If at least one $T\_KS_x$ value matches the received $R\_KS_x$, then the tag may consider the reader authorized or enhanced, but if no $T\_KS_x$ values match, the tag may consider the reader unauthorized or standard. In some embodiments, this functionality may be implemented in systems where a tag or reader is configured to track the number of interactions involving the group key, as described further below.

Figure 11:
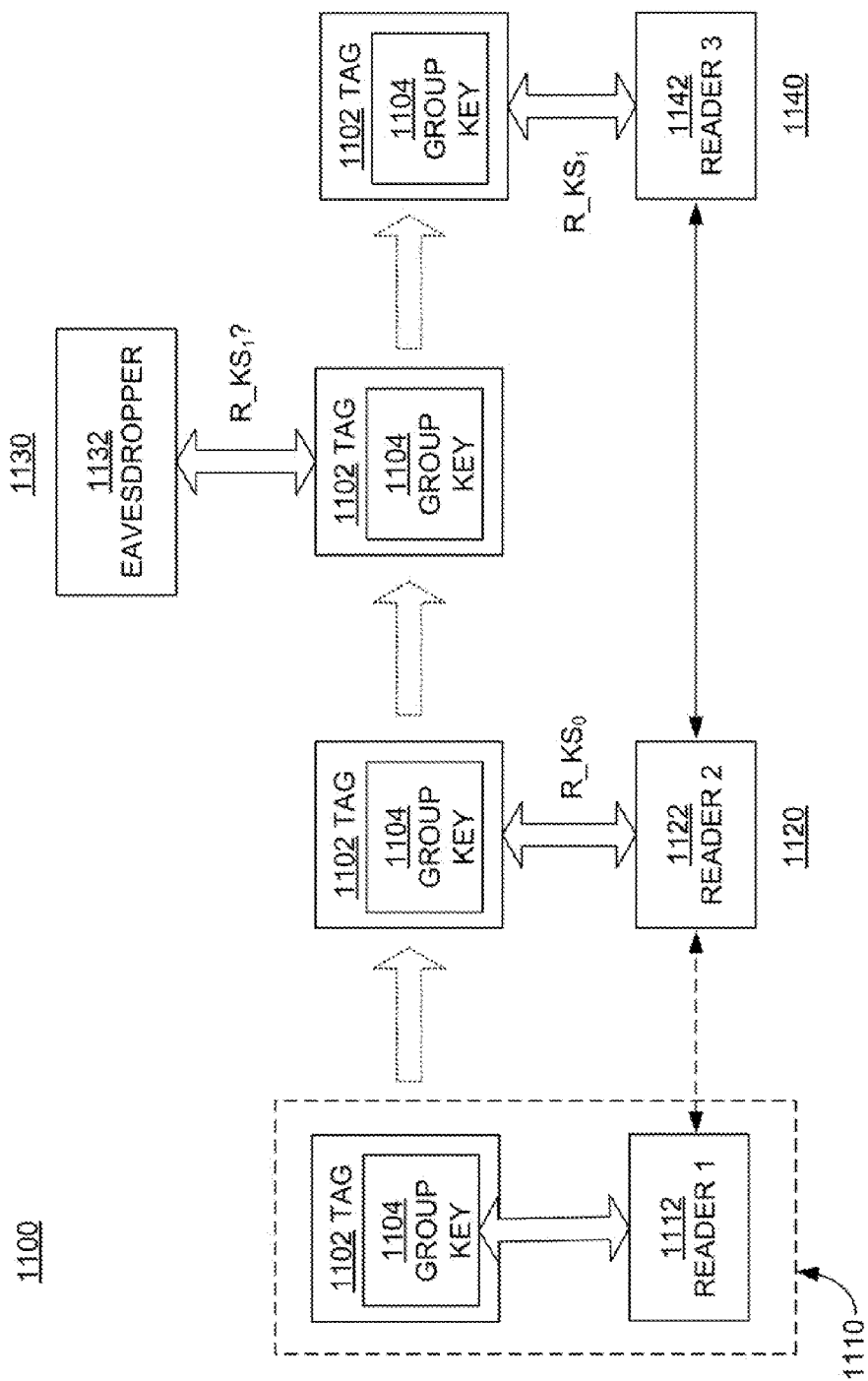
FIG. 11 is a diagram depicting how an RFID tag may be monitored using a series of linked readers.

FIG. 11 is a diagram 1100 depicting how an RFID tag may be monitored using a series of linked readers. At an optional first stage 1110, a tag 1102 may receive a group key 1104 from a reader 1 1112. Reader 1 1112 may be associated with some entity allowed to identify, locate, and track tag 1102. In other embodiments, a person or some other entity to be tracked may receive tag 1102 already preloaded with group key 1104, in which case first stage 1110 occurs before tag 1102 is provided to the person/entity. If first stage 1110 is present, reader 1 1112 may communicate the fact that it has provided group key 1104 to tag 1102 to other authorized readers, such as reader 2 1122. In some embodiments, reader 1 1112 may receive or know information about tag 1102, such as one or more identifiers, and may communicate some or all of the information to other authorized readers.

At a second stage 1120, authorized reader 2 1122 may request information from tag 1102. Before providing the requested information, tag 1102 may attempt to verify that reader 2 1122 is in fact authorized and therefore knows group key 1104. To do so, tag 1102 may perform the process described above in FIG. 10. Tag 1102 may first transmit a random number RN to reader 2 1122 and subsequently receive a verification value $R\_KS_0$ from reader 2 1122. Tag 1102 then computes a corresponding verification value $T\_KS_0$ using the RN and group key 1104 and compares the received $R\_KS_0$ to the computed $T\_KS_0$. If the two correspond, which should be the case since reader 2 1122 is authorized, then tag 1102 may provide the requested information to reader 2 1122. Tag 1102 may also perform additional verification on reader 2 1122 as described above in FIG. 10.

Reader 2 1122 may communicate information about its interaction with tag 1102 to other authorized readers, such as reader 3 1142 and/or reader 1 1112. For example, reader 2 1122 may indicate to other authorized readers that it successfully received tag information from tag 1102 at a particular time and location.

In some embodiments, the process for additional verification described above in FIG. 10 may be used to verify multiple, connected readers. For example, suppose tag 1102 successfully verified reader 2 1122 after receiving a single response $R\_KS_0$ from reader 2 1122. Tag 1102 may attempt to verify subsequent readers by determining whether they reply with the correct next response of $R\_KS_1$. In these embodiments, reader 2 1122 may transmit the RN, an indication of the next correct response $R\_KS_1$, or some other information allowing other authorized readers to derive the next correct response $R\_KS_1$.

At a third stage 1130, an eavesdropper (not authorized) reader 1132 may request information from tag 1102. Tag 1102, before providing the requested information, attempts to verify that eavesdropper reader 1132 is authorized and both knows the group key and knows the correct next response R_KS$_1$. To begin the verification process, tag 1102 may either transmit the same random number RN used above or R_KS$_0$. Eavesdropper reader 1132 may not know either group key 1104 or the current next step of the additional verification process, and therefore may not be able to provide the correct next response R_KS$_1$. Accordingly, tag 1102 treats eavesdropper reader 1132 as unauthorized and does not provide any requested information.

At a fourth stage 1140, authorized reader 3 1142 may request information from tag 1102. As with third stage 1130, tag 1102 attempts to verify that reader 3 1142 is authorized by either transmitting the random number RN or R_KS$_0$. Since reader 3 1142 is authorized, it knows the group key 1104 and can compute the correct next response R_KS$_1$ based on information received from reader 2 1122. Reader 3 1142 then sends the correct next response R_KS$_1$ to tag 1102, which then compares the received R_KS$_1$ to a computed T_KS$_1$. If the two correspond, which should be the case since reader 3 1142 is authentic, tag 1102 may provide the requested information to reader 3 1142.

As described above, in another embodiment it may be useful for a reader to determine whether a tag is authorized or compatible with as particular feature. In some embodiments, tags that are authorized or compatible with a particular feature know a group key. The reader, which also knows the group key, determines a tag's authorization or compatibility by determining whether the tag knows the group key.

Figure 12:
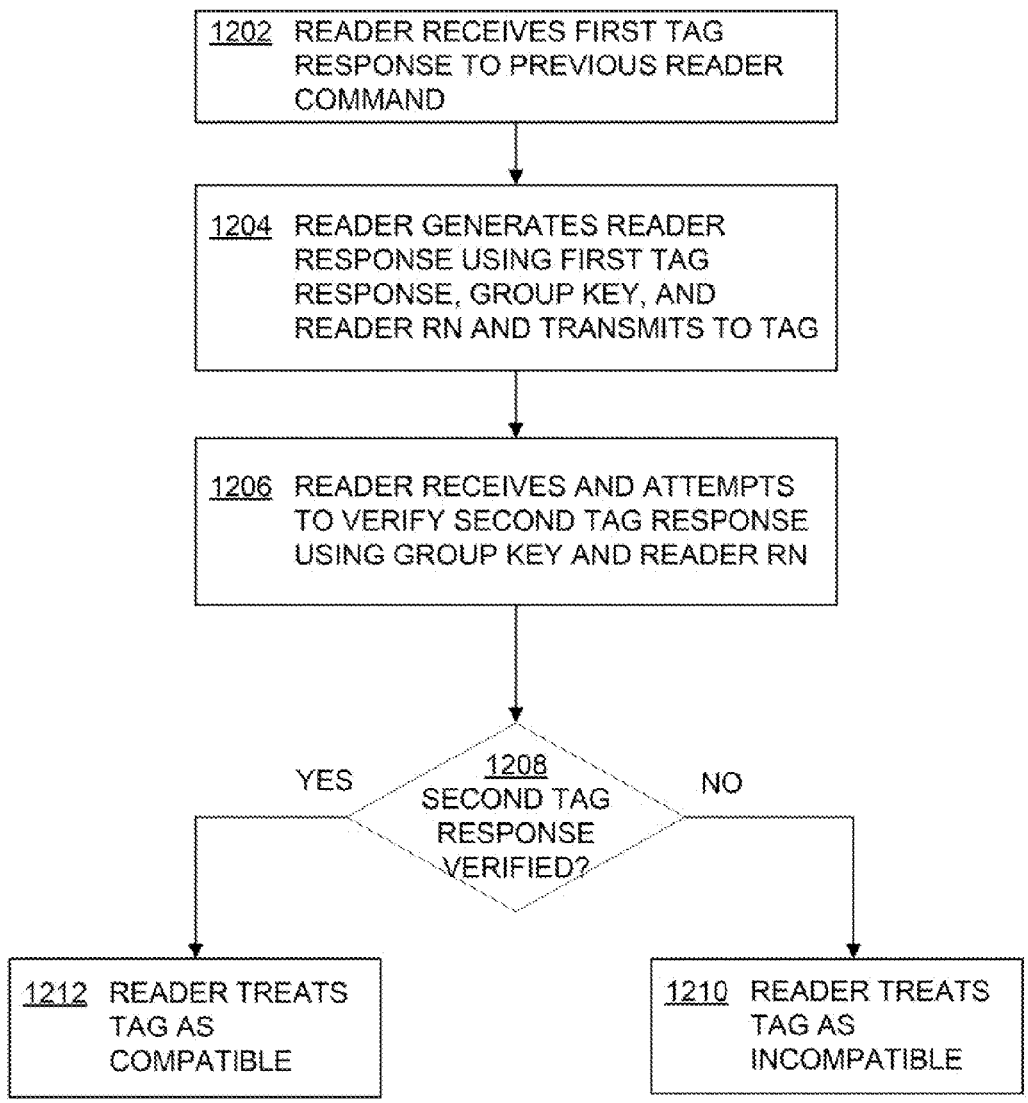
FIG. 12 is a flow diagram illustrating an RFID reader determining tag characteristics according to embodiments.

FIG. 12 is a flow diagram 1200 illustrating an RFID reader determining tag characteristics according to embodiments. At step 1202, a reader receives a first tag response to a previous reader command. For example, the reader may have requested a tag RN from the tag, and the first tag response may include the requested tag RN. At step 1204, the reader generates a reader response using the first tag response (e.g., a tag random number in the first tag response), the group key, and a reader RN. In some embodiment, the reader generates the reader response by encrypting a tag RN in the first tag response using the group key, for example using a stream cipher or block cipher as described above in step 1008 of FIG. 10. The reader RN may be encrypted along with the tag RN, or may be appended or concatenated to the encrypted tag RN. The reader then transmits the reader response to the tag.

At step 1206, the reader receives a second tag response from the tag and attempts to verify the second tag response using the group key and the reader RN. For example, the reader may attempt to decrypt the second tag response using the group key (or one or more key bits generated using the group key, as described above in FIG. 10) and compare the decrypted second tag response to the reader RN. If the two correspond, then the reader may consider the second tag response verified. At decision 1208, the reader determines whether the second tag response has been successfully verified (e.g., whether it corresponds to the reader RN). If not, then at operation 1210 the reader treats the tag as incompatible with (i.e., does not possess or is not authorized to implement) a particular functionality. On the other hand, if at decision 1208 the reader determines that the second tag response has been successfully verified, then at operation 1212 the reader treats the tag as compatible with (i.e., possesses and is authorized to implement) a particular functionality.

In some embodiments, the reader may verify multiple tag responses before treating the tag as compatible with a particular functionality. For example, the reader may treat the tag as compatible if the reader has received a number of correct verification values from the tag equal to or greater than a tag authentication threshold. As another example, the reader may treat the tag as compatible if the reader has engaged in a number of interactions with the reader involving the group key equal to or greater than the tag authentication threshold.

While in the above description additional data is cryptographically encoded onto an RN using a group key, other methods may be used to encode additional data onto an RN. For example, some shared data other than a cryptographic key (e.g., a fixed or dynamic string or data value) may be used to encode data onto an RN. In another example, the additional data could simply be used as the data value. In some embodiments, the additional data may be concatenated with or inserted into the data value while maintaining the overall length of the data value. The additional data may also be combined with the data value using arithmetic or bitwise operations, such as a bitwise exclusive-OR operation.

Figure 13:
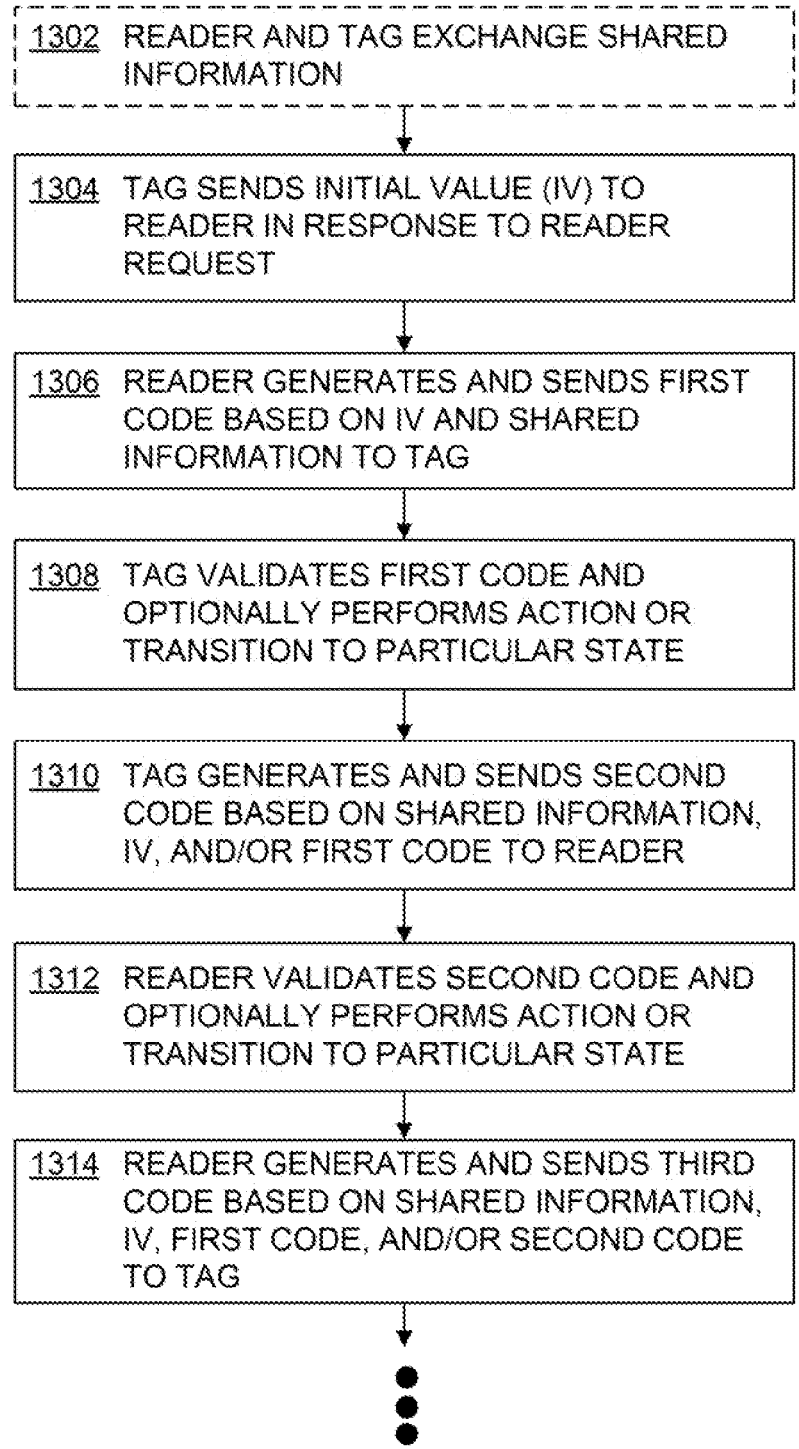
FIG. 13 is a flow diagram illustrating communications between a reader and a tag with data encoded onto an initial value.

FIG. 13 is a flow diagram 1300 illustrating communications between a reader and a tag with data encoded onto an initial value. At optional step 1302, an RFID reader and an RFID tag may exchange some sort of shared information if no shared information already exists. The shared information may include a shared or group key (as described above), a reader identifier, or some other data value, and may indicate how the shared data value is to be used to encode or decode data to and from another data value. In some embodiments, the shared information is not public, and is only known by authorized entities.

At step 1304, the tag may send an initial value (IV) to the reader in response to a reader request. For example, the IV may be a random number RN in response to a reader command such as the Query/QueryAdj/QueryRep command 922 or the REQ_RN command 932. The IV may be a random or pseudo-random number generated by the tag, although in other embodiments the IV may be a precomputed number stored on or known to the tag. In general, the IV may be independent of the shared information, although the IV could be based on the shared information in some situations.

At step 1306, the reader generates a first code based on the IV and the shared information, and sends the first code to the tag. The reader may generate the first code by encoding some additional information onto the IV based on the shared information, or may replace the IV entirely with additional information generated based on the IV and the shared information.

At step 1308, the to may validate the first code by determining whether the first code correctly derives from the IV and the shared information. For example, the tag may know how a correct code is to be derived from the IV and the shared information, and may perform the derivation and compare the derived, correct code with the first code. As another example, the tag may be able to reverse the process by which the first code is derived from the IV and the shared information, and may compare the output of the reversed process with the IV. If the tag determines that the first code correctly derives from the IV and the shared information, then the tag may conclude that the reader has at least some knowledge of the shared information. In some embodiments, the tag may optionally perform some action or transition to a particular operating state. For example, the tag may respond to the reader with a particular tag identifier, or may transition from an operating state in which a particular feature or functionality is not enabled to an operating state in which the tag feature or functionality is enabled, as described above.

At step 1310 the tag may then generate a second code based on the shared information, the IV, and/or the first code, and may send the second code to the reader. In some embodiments, the tag may generate the second code in a similar fashion to how the reader generated the first code at step 1306.

At step 1312, the reader may validate the second code by determining whether the second code correctly derives from the IV, the shared information, and/or the first code, similar to how the tag validated the first code at step 1308. Upon validation, the reader may now have some confidence that the tag has at least some knowledge of the shared information and may optionally perform some action or transition to a particular operating state, similar to the tag at step 1308. For example, the reader may respond to the to with a particular reader identifier, or may transition to an operating state in which a particular reader feature or functionality is enabled. Subsequently, at step 1314 the reader may generate a third code based on the shared information, the IV, the first code, and/or the second code, and may then send the third code to the tag. The process may then continue, with the tag and reader successively exchanging and validating codes. As the reader or tag continues to receive valid codes, the confidence of the reader or tag that the opposing party possesses the shared information may increase. In some embodiments, the tag or reader may use an authentication threshold as described above to determine when confidence in the opposing party is sufficient. While diagram 1300 depicts the reader and tag performing multiple validations, in some embodiments a single validation may be sufficient. For example, after the tag validates the first code in step 1308, it may deem the reader sufficiently authenticated, and may not send the second code. Similarly, after the reader validates the second code in step 1312, it may deem the tag sufficiently authenticated, and may not send the third code.

For a particular code sequence, given a known initial starting point (in other words, the IV) and the shared information, both the reader and the tag may be able to predict and generate any subsequent code in the code sequence. Accordingly, a message between the reader and the tag may be secured or encrypted using a subsequent code (as described above in FIG. 10). Moreover, given a particular code in the sequence, the reader or tag may be able to determine the location of the code in the sequence, and may therefore be able to determine a progress indicator that represents the number of previous secured interactions that have occurred, as a count value (e.g., the number of interactions) or as a numerical value (e.g., an identifier for the location of the code in the sequence or the actual value of the code). In some embodiments, a secured interaction is an interaction involving a particular code in the sequence, and may represent a reader-to-tag or tag-to-reader message, or some event occurring at the reader or tag, independent of another reader or tag. For example, a tag may be configured to advance its current location within a particular sequence when a particular tag event, such as power-up, inventory, access, or any other suitable event, occurs. In this example, a reader with knowledge of the IV and the shared information may be able to determine the number of events that have occurred by identifying the location of the tag within the sequence.

In some embodiments, different reader-tag pairs may share different information, which may correspond to different features, functionalities, or identities. Upon receiving a code, a reader or tag may be able to determine the identity of the originating tag or reader based on the known, shared information. For example, a tag, upon receiving a code from a reader, may be able to determine the identity of the reader. Moreover, the tag may also be able to determine whether the reader possesses a first feature or authority level, a second feature or authority level, or is otherwise unenhanced or unauthorized.

The operations described in process 800, 820, 840, 860, 1000, 1200, and 1300 are for illustrative purposes only. These operations may be implemented using additional or fewer operations and in different orders using the principles described herein. They might also be implemented using a single group key, multiple group keys, or a mixture of group keys and tag- or reader-specific keys.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the RFID embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Man modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if as specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc," is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a over third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method for a Radio Frequency Identification (RFID) tag integrated circuit (IC) storing a cryptographic key and capable of operating in at least first, second, and third distinct operating states, the method comprising:
    receiving a reader command;
    replying to the reader command with a first data value;
    receiving a reader acknowledgement including a second data value;
    computing a third data value based on the first data value and the cryptographic key;
    comparing the second data value to both the first data value and the third data value;
    if the second data value is identical to the first data value, then transitioning from the first operating state to the second operating state, wherein entering the second operating state comprises responding to a subsequent reader command with an alternate identifier or reducing an effective range of the IC;
    if the second data value is identical to the third data value, then transitioning from the first operating state to the third operating state; else
    one of transmitting an error code and adjusting a slot counter.

2. The method of claim 1, wherein: the identifier includes at least one of a TID, an EPC, and a key identifier; and the alternative identifier includes at least one of a truncated version of the identifier, an encrypted version of the identifier, a modified version of the identifier, a random value, and a preset value not identical to the identifier.

3. The method of claim 1, wherein entering the third operating state comprises:
    receiving a subsequent reader command requesting an identifier; and
    responding with one of the identifier and an encrypted version of the identifier.

4. The method of claim 1, further comprising, in response to entering the third operating state:
    replying to a subsequent reader command with a fourth data value;
    receiving a reader response including a fifth data value; and
    in response to determining that the fifth data value is based on at least the cryptographic key, granting access to an additional tag feature.

5. The method of claim 4, wherein the fourth data value is one of:
    the second data value;
    based on the first data value and the cryptographic key but not identical to the second data value;
    a random value; and
    a preset value.

6. The method of claim 4, wherein the fifth data value is a portion of a keystream formed based on one of:
    the first data value and the cryptographic key, and
    the fourth data value and the cryptographic key; and
    the method further comprises successively receiving subsequent portions of the keystream until a reader authentication threshold has been reached.

7. A Radio Frequency Identification (RFID) tag integrated circuit (IC) comprising:
    a memory configured to store a cryptographic key; and
    a processor block coupled to the memory and configured to:
        receive a reader command;
        reply to the reader command with a first data value;

receive a reader acknowledgement including a second data value;

compute a third data value based on the first data value and the cryptographic key;

compare the second data value to both the first data value and the third data value;

if second data value is identical to the first data value, then transitioning from the first operating state to the second operating state, wherein the processor block is configured to, in the second operating state, respond to a subsequent reader command with an alternative identifier or reduce an effective range of the IC;

if the second data value is identical to the third data value, transition from the first operating state to the third operating state; else one of transmit an error code and adjust a slot counter.

8. The IC of claim 7, wherein: the identifier includes at least one of a TID, an EPC, and a key identifier, and the alternative identifier includes at least one of a truncated version of the identifier, an encrypted version of the identifier, a modified version of the identifier, a random value, and a preset value not identical to the identifier.

9. The IC of claim 7, wherein the processor block is configured to, in the third operating state:

receive a subsequent reader command requesting an identifier, and respond with one of the identifier and an encrypted version of the identifier.

10. The IC of claim 7, wherein the processor block is further configured to:

reply to a subsequent reader command with a fourth data value;

receive a reader response including a fifth data value; and in response to determining that the fifth data value is based on the cryptographic key, granting access to an additional tag feature.

11. The IC of claim 10, wherein the fourth data value is one of:

the second data value;

based on the first data value and the cryptographic key but not identical to the second data value;

a random value; and a preset value.

12. The IC of claim 10, wherein the fifth data value is a portion of a keystream formed based on one of:

the first data value and the cryptographic key; and the third data value and the cryptographic key; and the processor block is further configured to receive subsequent portions of the keystream until a reader authentication threshold has been reached.

13. A method to select an operating state of a Radio Frequency Identification (RFID) tag, the method comprising:

receiving a first response including a first data value from the tag;

determining whether the tag is to transition from a first tag operating state to a second operating state or a third tag operating state;

in response to determining that the tag is to transition to the second operating state, transmitting an acknowledgement including the first data value to the tag, wherein transition to the second operating state comprises responding to a reader command with an alternative identifier or reducing an effective range of the tag; and in response to determining that the tag is to transition to the third operating state, transmitting an acknowledgement including a second data value but not the first data value, the second data value based on the first data value and a cryptographic key.

14. The method of claim 13, wherein the first and second tag operating states are standard, distinct protocol operating states and the third tag operating state is a modified protocol operating state.

15. The method of claim 13, further comprising, upon transmitting the acknowledgement including the second data value:

receiving a second response including a third data value from the tag;

in response to determining that the third data value is based on the first data value and the cryptographic key but not identical to the second data value, determining that the tag has access to the cryptographic key.

16. The method of claim 15, wherein the second data value and the third data value are different portions of a keystream formed based on the first data value and the cryptographic key, and the method further comprises successively receiving subsequent portions of the keystream until a tag authentication threshold has been reached.

17. The method of claim 1, further comprising computing the third data value before receiving the reader acknowledgement.

* * * * *

UNITED STATES PATENT AND TRADEMARK OFFICE
CERTIFICATE OF CORRECTION

Page 1 of 2

PATENT NO. : 9,773,133 B2
APPLICATION NO. : 14/815823
DATED : September 26, 2017
INVENTOR(S) : Ron Oliver et al.

It is certified that error appears in the above-identified patent and that said Letters Patent is hereby corrected as shown below:

In the Specification
Column 1, Line 34, Delete "RFID" and insert -- RF --, therefor.
Column 1, Line 48, Delete "RFID" and insert -- RF --, therefor.
Column 1, Line 50, Delete "identities," and insert -- identifies, --, therefor.
Column 1, Line 63, Delete "RFID" and insert -- RF --, therefor.
Column 2, Line 23, Delete "as" and insert -- a --, therefor.(First Occurrence)
Column 2, Line 23, Delete "as" and insert -- a --, therefor.(Second Occurrence)
Column 2, Line 56, Delete "tag," and insert -- tag --, therefor.
Column 2, Line 63, Delete "as" and insert -- a --, therefor.
Column 3, Line 59, Delete "to" and insert -- tag --, therefor.
Column 4, Line 13, Delete "signals)" and insert -- signals). --, therefor.
Column 4, Line 14, Delete "via," and insert -- via --, therefor.
Column 4, Line 50, Delete "to" and insert -- a --, therefor.
Column 4, Line 57, After "types" insert -- (e.g., --.
Column 5, Line 20, Delete "lacing" and insert -- facing --, therefor.
Column 5, Line 42, Delete "as" and insert -- a --, therefor.
Column 6, Line 5, Delete "as" and insert -- a --, therefor.
Column 6, Line 16, Delete "According," and insert -- According --, therefor.
Column 6, Line 30, Delete "as" and insert -- a --, therefor.
Column 7, Line 1, Delete "RFID)" and insert -- RFID --, therefor.
Column 7, Line 24, Delete "RFID" and insert -- RF --, therefor.
Column 7, Line 36, Delete "interlacing," and insert -- interfacing, --, therefor.
Column 8, Line 6, Delete "RFID" and insert -- RF --, therefor.
Column 9, Line 16, Delete "Spine" and insert -- Some --, therefor.
Column 9, Line 24, Delete "RFID" and insert -- RF --, therefor.
Column 10, Line 6, Delete "as" and insert -- a --, therefor.
Column 10, Line 7, Delete "to" and insert -- a --, therefor.
Column 11, Line 5, Delete "RE" and insert -- RF --, therefor.
Column 11, Line 63, Delete "as" and insert -- a --, therefor.
Column 12, Line 5, Delete "as" and insert -- a --, therefor.

Signed and Sealed this
Sixteenth Day of January, 2018

Joseph Matal
*Performing the Functions and Duties of the
Under Secretary of Commerce for Intellectual Property and
Director of the United States Patent and Trademark Office*

Column 12, Line 41, Delete "to" and insert -- a --, therefor.
Column 13, Line 6, Delete "ma" and insert -- may --, therefor.
Column 13, Line 60, Delete "as" and insert -- a --, therefor.
Column 14, Line 2, Delete "as" and insert -- a --, therefor.
Column 14, Line 18, Delete "to" and insert -- a --, therefor.
Column 15, Line 67, Delete "perform" and insert -- performed --, therefor.
Column 16, Line 8, Before "RN16" delete "spec page".
Column 17, Line 15, Delete "for" and insert -- (or --, therefor.
Column 17, Line 17, Delete "to" and insert -- a --, therefor.
Column 18, Line 21, Delete "verily" and insert -- verify --, therefor.
Column 18, Line 38, Delete "preceding," and insert -- preceding --, therefor.
Column 19, Line 10, Delete "to" and insert -- a --, therefor.
Column 19, Line 27, Delete "to" and insert -- tag --, therefor.
Column 19, Line 57, Delete "as" and insert -- a --, therefor.
Column 20, Line 28, Delete "fir" and insert -- for --, therefor.
Column 21, Line 6, Delete "dramically" and insert -- dynamically --, therefor.
Column 21, Line 25, Delete "such" and insert -- (such --, therefor.
Column 21, Line 49, Delete "during," and insert -- during --, therefor.
Column 21, Line 55, Delete "requesting," and insert -- requesting --, therefor.
Column 21, Line 67, Delete "as" and insert -- a --, therefor.
Column 22, Line 21, Delete "seine" and insert -- some --, therefor.
Column 23, Line 42, Delete "to" and insert -- tag --, therefor.
Column 25, Line 29, Delete "as" and insert -- a --, therefor.
Column 26, Line 55, Delete "to" and insert -- tag --, therefor.
Column 27, Line 23, Delete "to" and insert -- tag --, therefor.
Column 28, Line 40, Delete "and or" and insert -- and/or --, therefor.
Column 28, Line 45, Delete "Man" and insert -- Many --, therefor.
Column 29, Line 9, Delete "as" and insert -- a --, therefor.
Column 29, Line 48, Delete "of"A"" and insert -- of "A" --, therefor.
Column 29, Line 58, Delete "over" and insert -- lower --, therefor.

In the Claims
Column 31, Line 7, Claim 7, after "if" insert -- the --.
Column 31, Line 18, Claim 8, delete "identifier," and insert -- identifier; --, therefor.
Column 31, Line 25-26, Claim 9, delete "identifier," and insert -- identifier; --, therefor.